(12) United States Patent
Morgan et al.

(10) Patent No.: US 10,825,021 B2
(45) Date of Patent: Nov. 3, 2020

(54) SYSTEM FOR NETWORK RESOURCE EXCHANGING

(71) Applicant: BANK OF AMERICA CORPORATION, Charlotte, NC (US)

(72) Inventors: Rebecca Stepp Morgan, Charlottesville, VA (US); Robert Edward Marshall, Charlotte, NC (US); Judith C. Taylor, Charlotte, NC (US); Shawn Cart Gunsolley, Charlotte, NC (US); Deirdre Spehar, Belleville, IL (US); Chad Ryan Compton, Valley Park, MO (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 16/400,935

(22) Filed: May 1, 2019

(65) Prior Publication Data
US 2020/0134986 A1    Apr. 30, 2020

Related U.S. Application Data

(60) Provisional application No. 62/751,138, filed on Oct. 26, 2018.

(51) Int. Cl.
| | |
|---|---|
| G06Q 20/38 | (2012.01) |
| G06Q 40/02 | (2012.01) |
| G06Q 20/32 | (2012.01) |
| H04L 9/06 | (2006.01) |
| G06Q 20/40 | (2012.01) |
| G06Q 40/04 | (2012.01) |
| G07F 19/00 | (2006.01) |
| H04L 9/32 | (2006.01) |
| G06Q 20/42 | (2012.01) |

(52) U.S. Cl.
CPC ... *G06Q 20/38215* (2013.01); *G06Q 20/3221* (2013.01); *G06Q 20/401* (2013.01); *G06Q 20/42* (2013.01); *G06Q 40/02* (2013.01); *G06Q 40/04* (2013.01); *G07F 19/206* (2013.01); *G07F 19/211* (2013.01); *H04L 9/0637* (2013.01); *H04L 9/3236* (2013.01); *H04L 2209/38* (2013.01); *H04L 2209/56* (2013.01)

(58) Field of Classification Search
CPC .............................................. G06Q 20/38215
USPC .......................................................... 235/379
See application file for complete search history.

(56) References Cited

U.S. PATENT DOCUMENTS

| | | |
|---|---|---|
| 7,591,413 B1 | 9/2009 | Block et al. |
| 7,789,298 B1 | 9/2010 | Ramachandran et al. |
| 8,577,804 B1 | 11/2013 | Bacastow |
| 10,594,991 B1 | 3/2020 | Skolnick |

(Continued)

*Primary Examiner* — Allyson N Trail
(74) *Attorney, Agent, or Firm* — Michael A. Springs; Moore & Van Allen PLLC; Jeffrey R. Gray (57) ABSTRACT

Resource exchange platform for integrating and facilitating direct resource exchanges and resource tracking between multiple organizations. The platform may establish an exchange program directly between organizations to identify, trade, and settle the transfer of physical resources physically and/or electronically. The resource exchange platform provides a more efficient exchange of physical resources, more secure trackable resource exchanges, and more agency insight into resource exchanges in order to identify potential interactions involving misappropriated resources.

20 Claims, 5 Drawing Sheets

(56) References Cited

U.S. PATENT DOCUMENTS

| | | |
|---|---|---|
| 2002/0105665 A1* | 8/2002 | Wasilewski ........ H04N 1/00193 |
| | | 358/1.13 |
| 2002/0138365 A1 | 9/2002 | Matsubara |
| 2005/0080520 A1 | 4/2005 | Kline et al. |
| 2007/0260466 A1 | 11/2007 | Casella et al. |
| 2009/0116491 A1* | 5/2009 | Noma .................. H04W 76/15 |
| | | 370/395.1 |
| 2010/0332341 A1 | 12/2010 | Rost |
| 2011/0258128 A1 | 10/2011 | Hambleton et al. |
| 2013/0124411 A1 | 5/2013 | Kobres et al. |
| 2013/0204783 A1* | 8/2013 | Klose .................. G06Q 20/042 |
| | | 705/42 |
| 2013/0346309 A1* | 12/2013 | Giori ...................... G06Q 20/10 |
| | | 705/43 |
| 2014/0214505 A1 | 7/2014 | Shuster-Arechiga et al. |
| 2016/0247176 A1 | 8/2016 | Dumas et al. |
| 2017/0118609 A1 | 4/2017 | Rodoni |
| 2018/0158033 A1 | 6/2018 | Woods et al. |
| 2019/0158418 A1* | 5/2019 | Way .................... G06F 11/3006 |
| 2019/0265062 A1 | 8/2019 | Rodoni |
| 2020/0002090 A1 | 1/2020 | Wolfenden |

\* cited by examiner

SYSTEM FOR NETWORK RESOURCE EXCHANGING

CROSS-REFERENCE TO RELATED APPLICATIONS

This application claims the benefit of U.S. Provisional Patent Application Ser. No. 62/751,138, filed Oct. 26, 2018 entitled "System for Resource Visibility," the entirety of which is incorporated herein by reference.

FIELD

The present invention relates to a resource exchange platform, and more particularly to a resource exchange platform that allows for electronic exchange of physical resources directly between organizations.

BACKGROUND

Present conventional systems do not have the capability to allow a user to track resource distribution from conception through supply chain. Currently, manual sorting of resources is performed and portions of the resource supply chain are not visible. Moreover, physical resources must be transferred between multiple parties instead of directly transferring resources between the parties. As such, there exists a need for a system to facilitate tracking of resource distribution and resource exchange through the supply chain.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system, method and computer program product for resource exchange that integrates and facilitates direct resource exchange and tracking between multiple organizations. In this way, the system may establish an exchange program directly between organizations to identify, trade, and settle the transfer of physical resources electronically.

Embodiments of the invention comprise systems, methods, and/or computer program products for facilitating a plurality of resource exchanges between a plurality of organizations. The invention comprises providing one or more resource exchange interfaces to the plurality of organizations, wherein the one or more resource exchange interfaces comprise an indication of available resources for exchange. The invention further comprises receiving confirmation from a first organization and/or a second organization regarding a resource exchange based on the available resources for exchange, wherein the confirmation includes resource exchange characteristics. The invention also comprises sending a physical transfer request for the resource exchange including the resource exchange characteristics in order to transfer physical resources that meet the resource exchange characteristics. The invention comprises settling the resource exchange electronically on a ledger, wherein an agency has access to the plurality of resource exchanges by the plurality of organizations on the ledger.

In further accord with embodiments, the invention comprises identifying a resource acquisition request from the first organization and a resource disbursement request from the second organization for the resource exchange.

In other embodiments of the invention, the indication of the available resources is provided through the one or more resource exchange interfaces listing a plurality of resource acquisition requests and a plurality of resource disbursement requests from the plurality of organizations.

In yet other embodiments, the invention further comprises analyzing a plurality of resource acquisition requests from the plurality of organizations and analyzing a plurality of resource disbursement requests from the plurality of organizations. The invention further comprises identifying one or more potential resource exchanges between the plurality of organizations, wherein the one or more potential resource exchanges include matches of a resource acquisition request and a resource disbursement request.

In still other embodiments of the invention, the transfer of the physical resources is performed without transferring the physical resources to and from an agency location.

In other embodiments of the invention, the transfer of the physical resources occurs at a resource center without transferring the physical resources to and from organization resource locations.

In further accord with embodiments of the invention, the resource exchange characteristics for the resource exchange comprises a resource amount, one or more resource denominations, one or more resource exchange locations, and resource exchange timing.

In other embodiments of the invention, the one or more denominations for the resource exchange comprises a first resource denomination for a resource acquisition request from the first organization that is different from a second denomination for a resource disbursement request from the second organization.

In yet other embodiments of the invention, the one or more resource exchange locations comprise an exchange within a resource center, wherein the transfer of the physical resources comprises moving the physical resources from a second organization cage to a first organization cage without transferring the physical resources to or from an agency resource location.

In still other embodiments of the invention, the one or more resource exchange locations comprise organization resource locations, wherein the transfer of the physical resources comprises moving the physical resources from a second resource location of the second organization to a first resource location of the first organization without transferring the physical resources to or from a resource center.

In other embodiments of the invention, the resource timing sets when the transfer of the physical resources occur.

In further accord with embodiments of the invention, the ledger is implemented through use of a blockchain, wherein the blockchain comprises a private blockchain or a hybrid private and public blockchain.

In other embodiments of the invention, the ledger is implemented through use of the blockchain using distributed ledgers.

In still other embodiments of the invention, settlement is also electronically settled using organization ledgers of the first organization and the second organization, wherein each of the organization ledgers are only accessible by an organization associated with its organization ledger.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present disclosure will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout.

Figure 1:
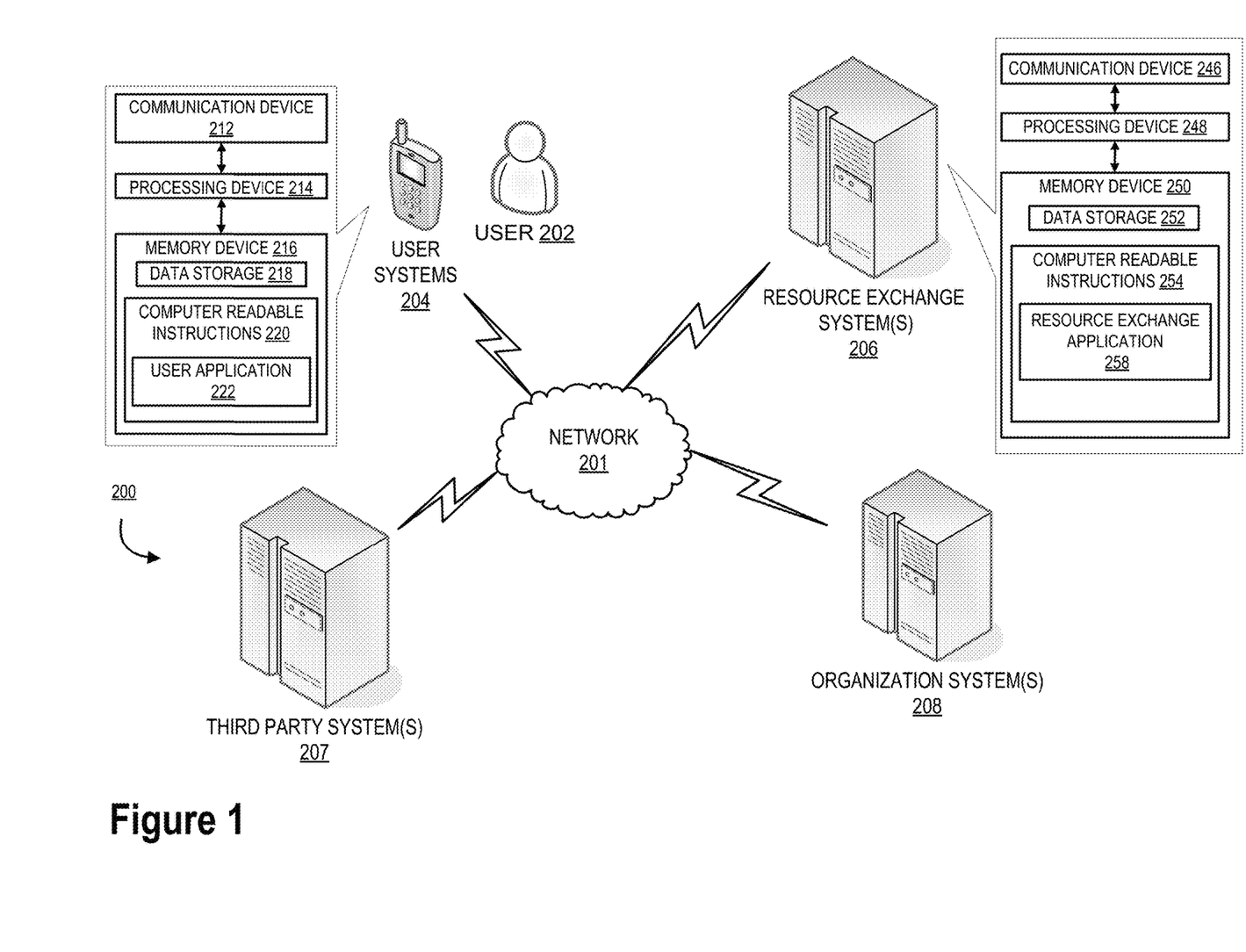
FIG. 1 provides an intelligent resource visibility and exchange system environment, in accordance with embodiments of the present disclosure.

FIG. 1 illustrates a resource visibility and exchange system environment 200, in accordance with embodiments of the present invention. The resource exchange platform facilitates the exchange of physical resources using an electronic exchange over a distributive network with specialized data feeds. FIG. 1 provides a unique system that includes specialized systems communicably linked across the distributive network of nodes required to perform the functions described herein.

As illustrated in FIG. 1, one or more organization systems 208 are operatively coupled, via one or more networks 201, to one or more user systems 204, one or more resource exchange systems 206, and/or one or more third party systems 207. In this way, the organization systems 208 can send information to and receive information from the user systems 204, the resource exchange systems 206, and/or third party systems 207. FIG. 1 illustrates only one example of an embodiment of the system environment 200, and it will be appreciated that in other embodiments one or more of the systems (e.g., computer systems, servers, devices, or the like) may be combined into a single system, may be split into multiple systems, or the like.

The network 201 may be a system specific distributive network receiving and distributing specific network feeds and identifying specific network associated triggers. The network 201 may be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, one or more users 202 may be an individual such as an employee, representative, associate, agent, vendor, customer, or the like of the organization and/or third-party, as will be described in further detail herein. In some embodiments, the one or more users 202 have a user system(s) 204, such as a mobile device (e.g., mobile phone, smart phone, personal data assistant (PDA), tablet, laptop computer, wearable, or other mobile device, such as a device that is operatively coupled to or integrated with a vehicle—such as a car, truck, cycle, or any other type of vehicle), a desktop, computer, or any other type of computing device. The user system 204 may be a device for business and/or personal use. The user system 204 generally comprises one or more communication devices 212, one or more processing devices 214, and one or more memory devices 216. The one or more processing devices 214 are operatively coupled to the one or more communication devices 212 and the one or more memory devices 216. The one or more processing devices 214 use the one or more communication devices 212 to communicate with the network 201 and other systems on the network 201, such as, but not limited to the resource exchange systems 206, the organization systems 208, and the third party systems 207. As such, the one or more communication devices 212 generally comprise a modem, server, or other device for communicating with other devices on the network 201. The one or more communication devices 212 may also include a display, mouse, keyboard, button, touchpad, touch screen, microphone, speaker, LED, light, joystick, switch, buzzer, bell, and/or other user input/output device for communicating with one or more users 202.

It should be understood that as used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The one or more user systems 204 comprise computer-readable instructions 220 and data storage 218 stored in the one or more memory devices 216, which in one embodiment includes the computer-readable instructions 220 of one or more user applications 222. In some embodiments, the one or more user applications 222 allows a user 202 to send to, and receive communications from, the resource exchange system 206 and/or other systems described herein.

As further illustrated in FIG. 1, the resource exchange system 206 generally comprises one or more communication devices 246, one or more processing devices 248, and one or more memory devices 250. The one or more processing devices 248 are operatively coupled to the one or more communication devices 246 and the one or more memory devices 250. The one or more processing devices 248 use the one or more communication devices 246 to communicate with the network 201 and other devices on the network 201, such as, but not limited to the organization systems 208, the third party systems 207, and/or the user systems 204. As such, the one or more communication devices 246 generally comprise a modem, server, or other device for communicating with other devices on the network 201.

As further illustrated in FIG. 1, the resource exchange systems 206 comprise computer-readable instructions 254 stored in the one or more memory devices 250, which in one embodiment includes the computer-readable instructions 254 of a resource exchange application 258. In some embodiments, the one or more memory devices 250 include data storage 252 for storing data related to the resource exchange systems 206, such as but not limited to data created and/or used by the users 202 and organizations with respect to the resource exchange platform, as will be discussed herein. The resource exchange systems 206, using the one or more processing devices 248 code certain communication functions described herein. In one embodiment, the computer-executable program code of a resource exchange application 258 may also instruct the one or more processing devices 248 to perform certain logic, data processing, and data storing functions of the application. The one or more processing devices 248 are configured to use the one or more communication devices 246 to communicate with and ascertain data from one or more organization systems 208, third party systems 207, and/or user systems 204.

As illustrated in FIG. 1, the third party systems 207 are connected to the organization systems 208, the user systems 204, and the resource exchange systems 206. The third party systems 207 have the same or similar components as described above with respect to the user systems 204 and the resource exchange systems 206 (e.g., one or more processing devices, one or more communication devices, one or more memory devices including computer readable medium for storing data, code, an application, or other information). While only one third party system 207 is illustrated in FIG. 1, it is understood that one or more third party systems 207 may make up the system environment 200 for a single third party and/or multiple third parties. The third party system 207 may include the systems of service providers (e.g., carriers for the resources, or the like).

As illustrated in FIG. 1, the organization systems 208 are operatively coupled to the third party systems 207, user systems 204, and resource exchange systems 206. The organization systems 208 may be associated with the resource exchange systems 206 (e.g., owned by the same organization, working together, or the like). The organization systems 208 have the same or similar components as described above with respect to the user systems 204 and the resource exchange systems 206 (e.g., one or more processing devices, one or more communication devices, one or more memory devices including computer readable medium for storing data, code, an application, or other information). While only one organization system 208 is illustrated in FIG. 1, it is understood that multiple organization systems 208 may make up the system environment 200 for a single organization and/or multiple organizations. The organizations systems 208 may include the systems of multiple organizations that may work in conjunction to move resources between the organizations, as needed.

It is understood that the systems described herein illustrate some embodiments of the present disclosure. It is further understood that one or more of the systems (or components thereof) can be combined, or split into other systems, and still function in the same or similar way as the embodiments described herein. Moreover, the systems described herein may include interfaces, as such, as used herein, an "interface" generally includes a plurality of interface devices and/or software that allow users to input commands and data to direct the processing device to execute instructions. For example, a user interface may include a graphical user interface (GUI) or an interface to input computer-executable instructions that direct the processing device to carry out specific functions.

Figure 2:
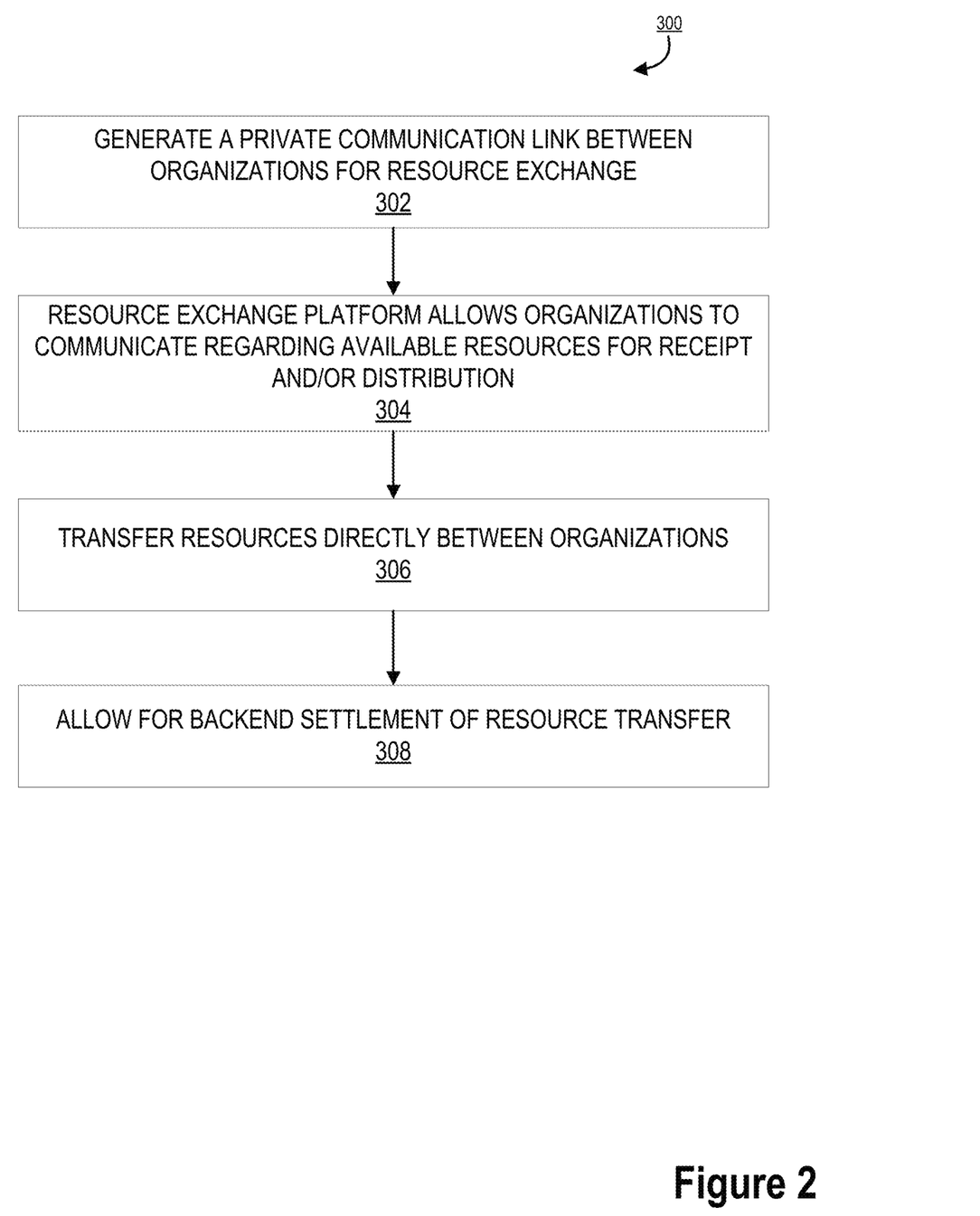
FIG. 2 provides a high level process flow illustrating a resource visibility and exchange process, in accordance with embodiments of the present disclosure.

FIG. 2 provides a process flow illustrating a high level resource exchange process 300, in accordance with embodiments of the present invention. As illustrated in block 302, the process 300 is initiated by generating a private communication link to allow organizations to communicate over a resource exchange platform regarding physical resource exchanges at organization resource locations (e.g., an organizations own resource operations, such as branches, ATM, kiosks, recyclers, resource distribution locations, or the like), resource centers (e.g., operated by the organization, a third-party, or the like that holds the resources of multiple organizations), and/or agency resource locations (e.g., governmental agencies, or the like that distribute and/or receive resources). As illustrated by block 304 in FIG. 2, the resource exchange platform allows organizations to communicate with each other and/or post a resource disbursement request (e.g., resource availability) and/or resource acquisition request (e.g., resources needed). Block 306 of FIG. 2 indicates that the organizations may enter into interactions for directly exchanging the physical resources based on resource availability (e.g., resource disbursement and acquisitions requests). That is, in some examples, as will be discussed in further detail herein, the organizations or a third party (e.g., a vendor, such as a service provider—resource carrier, or the like) transfers the resources directly between the organizations without involving an agency that is typically used to facilitate the exchange of the resources (e.g., new resources, old resources, or the like). FIG. 2 further illustrates in block 308 that the resource exchanges are settled on the back end of the interaction, without having to involve the agency to receive, provide, and/or account for any of the physical resources.

As will be described in further detail herein the resource exchange network 200, may include a ledger, and/or in some embodiments a public and/or private blockchain may be utilized to facilitate the electronic settlement, tracking, and/or monitoring of the resource exchanges. As will be described in further detail herein, each organization on the resource exchange network 200 may be able to review its own resource exchanges with other organizations. Moreover, in some embodiments of the invention, an agency (e.g., governmental entity, private entity, or the like) may be responsible for the resource exchanges, and as such, may be able to monitor every resource exchange between every organization, which provides a number of security benefits, in particular, being able to track misappropriated interactions because the agency has a holistic view of all of the resource exchange interactions of all of the organizations.

Figure 3:
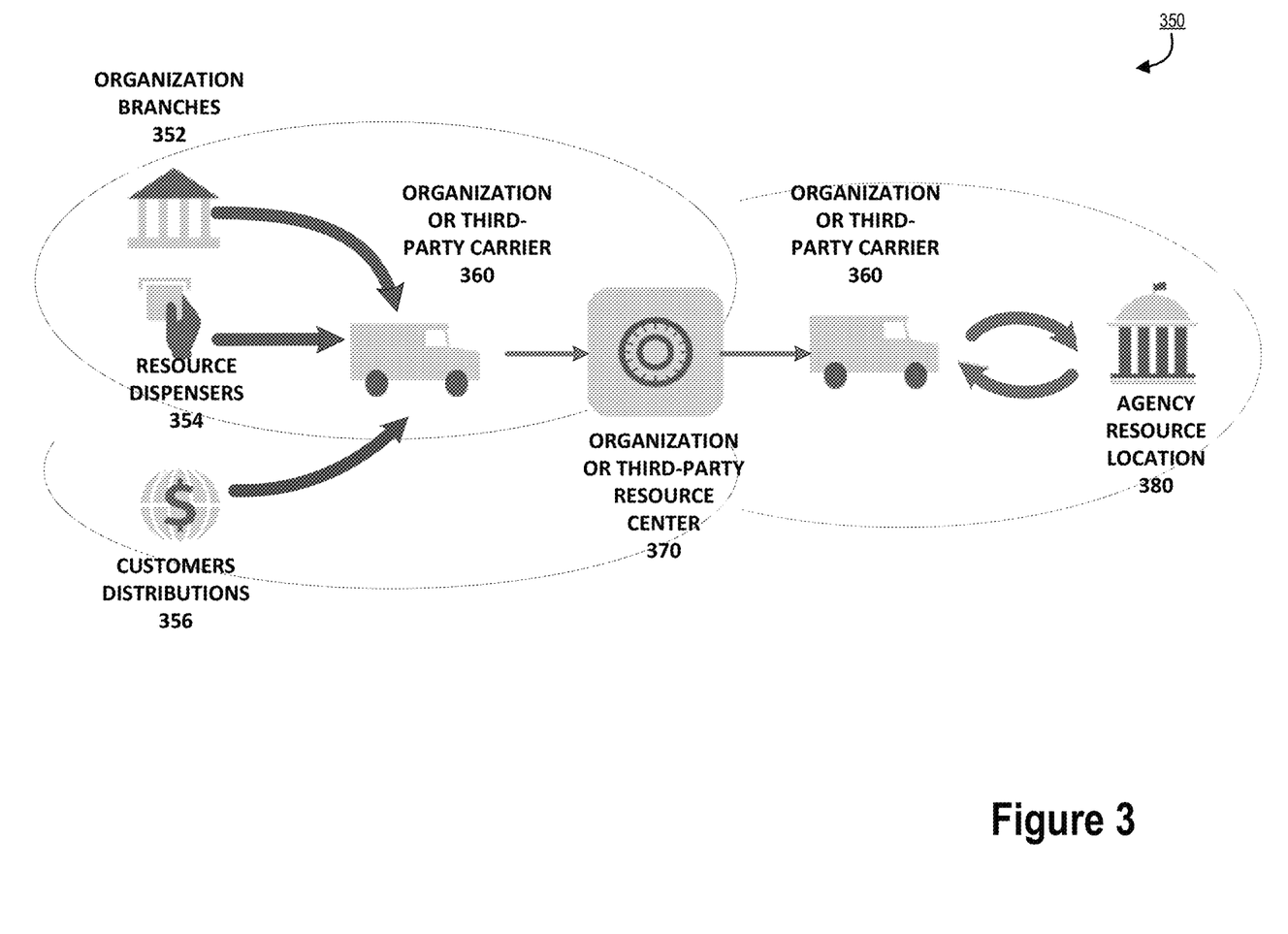
FIG. 3 provides a process map illustrating a resource visibility exchange between organizations, in accordance with embodiments of the present disclosure.

The resource exchange platform and process will be described in further detail below with respect to FIGS. 3 and 4. FIG. 3 provides a flow map 340 illustrating resource exchange flow. As illustrated, the organizations (e.g., financial institutions, or the like) may have organization resource locations 350 (e.g., financial branch centers 352, resource dispensers 354—such as ATMs, cash recyclers, or the like, resource distributions to customers 356, or the like). Moreover, resource centers 370 may store resources of multiple organizations, and may be operated by one or more of the organizations or by a third-party (e.g., a service provider, or the like that operates a vault). Additionally, an agency (e.g., the Federal Reserve, or the like) may operate agency resource locations 380 (e.g., federal reserve banks, or the like) that distribute to and collect resources from the organizations and/or the service provider. In typical operations, the resources of the organizations may be collected at the organization resource locations 350 by a third-party such as a vendor (e.g., service provider—a carrier 360, such as an armored carrier, or the like), and delivered to a resource center 370 (e.g., aggregated resource center, such as a resource vault that holds the resources of multiple organizations in different cages). Moreover, the third-party service provider 360 may also distribute resources to the organization resource locations 350 when the organizations request resources. The third-parties also transfer resources to and from the agency resource locations 380 to the resource centers 370 in order to have the resources available when requested by the organizations. Alternatively and/or additionally, the organizations (instead of the service provider 360) may deliver resources to and/or distribute resources from the organization resource locations 350, resource centers 370, and/or agency resource locations 380 directly without using a third-party.

It should be understood that when individual organizations exchange physical resources between the resource locations 350, 380 and/or the resource centers 370 (e.g., directly and/or through the use of the third party), the organizations are required to physically move the money between the organization resources locations 350, the resource centers 370, and/or the agency resource locations 380. The requirements for transfers are due in part because there is no system that allows for the exchange of resources from one organization directly to another organization, such as between organization locations 350 (e.g., a first financial institution branch and a second financial institution branch, between cages within a vault of a resource center 370, or the like), without first transferring the physical resources to the resource center 370 (e.g., a carrier vault, or other vendor vault), and/or from an agency location 380 (e.g., federal reserve resource location, or the like). For example, a carrier 360 may be picking up resources from a first organization, and delivering resources to a second organization. Under the current supply chain the third-party (e.g., carrier) must collect the resources from the first organization and deliver them to the resource center 370 (e.g., to a vault for storage in a first organization location at the resource center). Moreover, the third-party (e.g., carrier 360) has to collect the resources of the second organization from the resource center 370 and/or request the resources from the agency resource location 380 before delivering them to the second organization resource location. In other examples, a first organization may request resources from the agency resource location 380, while a second organization may request to send resources to the agency resource location 380. In order the complete the request, the carrier 360 must collect the resources requested by the first organization from the agency location 380 and deliver them to the resource center 370, and then the resource location 350, and collect the resources of the second organization from the resource locations 350 and/or resource center 370, and deliver the second organization resources to the agency resource location 380.

The exchange of the actual physical resources in the traditional supply chain may be required, at least in part, in order to keep the resources of the organizations separate from each other. That is, each organization has its own independent ledger that controls the movement of the physical resources. Moreover, the physical resource exchanges may be required to be run through the agency because the agency may be responsible for tracking the resource exchanges of the organizations for regulatory purposes. There is no system in place for a resource exchange system that would allow the third-party (e.g., carrier 360) to exchange resources on hand from one organization to another (e.g., from a first financial organization to a second financial organization) directly, regardless of the location of the resources. For example, there is currently no system that allows for the exchange of physical resources between organization resources locations 350 of different organizations (e.g., without having to transfer resources to and from the resource center 370), or between resources areas of different organizations within a resource center 370 (e.g., between different cages assigned to different organizations within the resource centers) without having to transfer resources to and from an agency resource location 380.

Moreover, there is no system in place that allows for the exchange of different denominations of resources. For example, should an organization request specific denomination, the third-party may be required to collect the specific detonations from the agency resource locations 380 instead of notifying the organization that other denominations are available and/or facilitating an exchange of denominations between different organizations (e.g., transferring the same amount of resources in different denominations between different resource locations 350 and/or between resource areas within resource centers 370) without having to access the resources at the agency resource location 380. It should be understood that the present supply chain of resource exchanges result in high costs due to the interactions that are required to take place to move physical resources from the organization resource locations 350, to the third-party resource center 370, and to the agency resources 380, and back to the organization resource locations 350. Moreover, each organization having separate general ledgers makes it difficult for the agency to track the movement of resources throughout the system environment 300.

Figure 4:
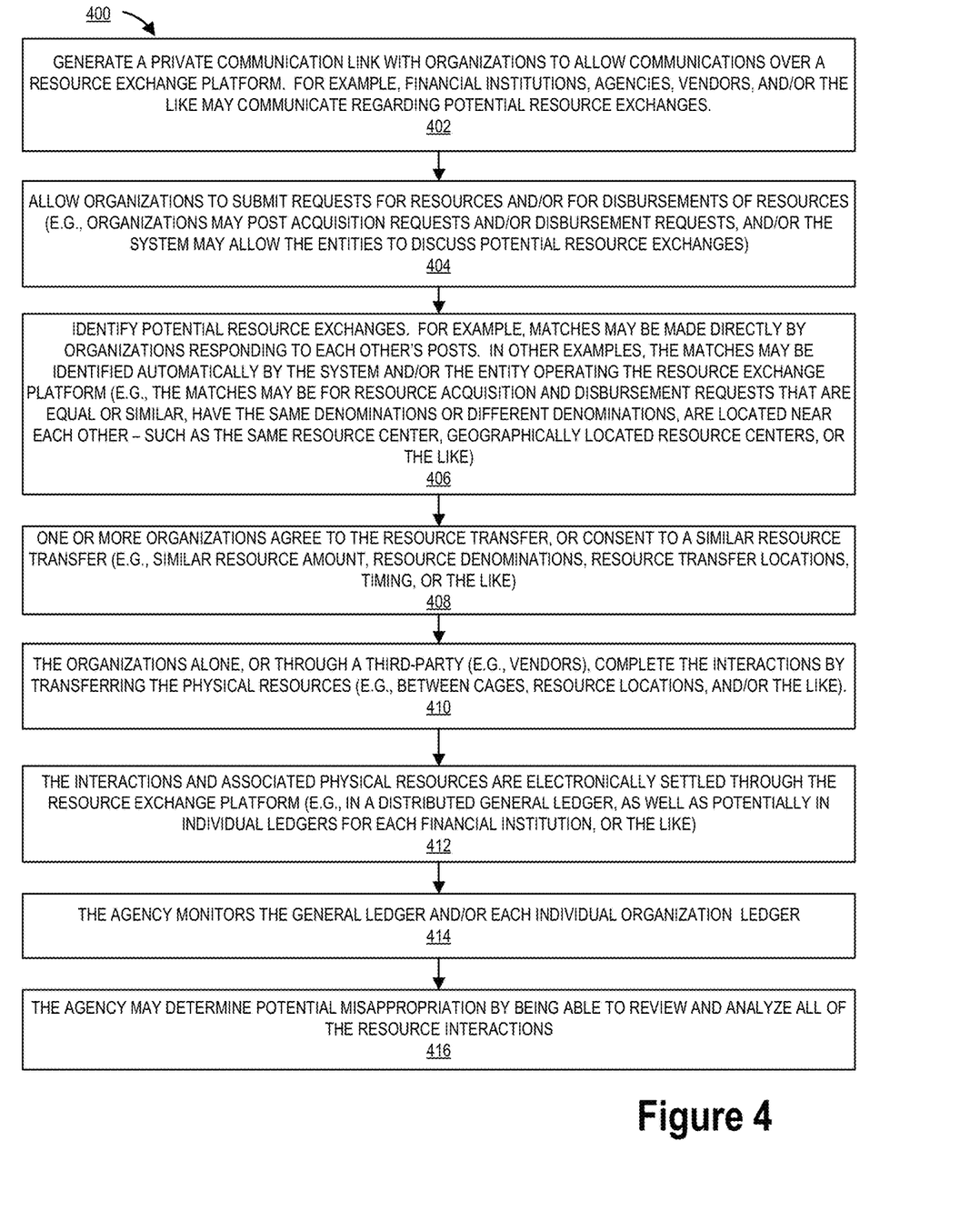
FIG. 4 provides a process flow illustrating resource visibility and exchange, in accordance with embodiments of the present disclosure.

FIG. 4 illustrates a resource exchange process 400, which utilizes the resource exchange platform described herein to provide a more efficient (e.g., faster, cost effective, or the like) exchange of physical resources, more secure trackable resource exchanges, and more agency insight into resource exchanges in order to identify potential misappropriated interactions. As illustrated by block 402 in FIG. 4, an entity (e.g., one or more of the organizations, a third-party, and/or the agency) may create a resource exchange platform that allows organizations to generate a private communication link with the resource exchange platform in order to exchange physical resources with other entities.

Block 404 of FIG. 4 illustrates that by accessing the resource exchange platform, the organizations (e.g., financial institutions) may communicate regarding potential resource exchanges. For example, organizations can submit requests for resources (e.g., resource acquisition requests, including specific resource amounts, specific resource denominations, at particular times, at particular locations, and/or the like or for ranges of any of the forgoing). Additionally, organizations can submit requests for distribution of resources (e.g., resource disbursement requests, including distribution of specific resource amounts, specific resource denominations, at particular times, at particular locations, and/or the like or for ranges of any of the forgoing). For example, a first organization may post that it needs "X resources" and a second organization may post that is needs "Y resources." Alternatively and/or additionally, an entity (e.g., organization, third-party, or the like) may submit available resources that other organizations may indicate an interest in to enter into a resource exchange.

FIG. 4 further illustrates in block 406 that potential resource exchange matches between organizations may be identified. In some embodiments the matches may be made between organizations responding directly to each other. That is, a first organization may post for a request for resources and a second organization may respond to the request with an offer to distribute the resources (or similar resources), or vice versa. In other embodiments, the matches may be facilitated automatically by the resource exchange system 206 or by the entity operating the resource exchange system 206. For example, the resource exchange system 206 may identify resource acquisition requests and resource disbursement requests that have the same or similar amounts, denominations, locations (e.g., resources are located at the same resource center, resource locations near each other, or the like), or the like. In other embodiments, when a resource acquisition request is made the resource exchange platform may determine where to secure the resources, for example, directly from another organization, from the resource center 370, or from the agency resource location 380. The resource exchange system 206 and/or the entity thereof may optimize the securing of the resources based on the resource acquisition request information, the availability of the resources, costs of the resource exchange (e.g., cost the agency may assess, costs the carriers 360 may assess, or the like). It should be understood that the resource exchange platform of the present invention provides insight into all of the potential resource acquisition requests and/or resource disbursement requests, which allows the resource exchange system 206 to optimize the resources exchanges between entities based on required speeds, costs, efficiency, or the like associated with the requests.

Block 408 of FIG. 4 illustrates that the organizations agree to the resource exchange. In some embodiments the organization requesting the resource exchange and/or the organization providing the resource exchange may be required to agree to the resource exchange request (e.g., one or both organizations may be required to agree). In some embodiments, the agreement may be automatic if the resources acquisition request and/or disbursement request is an exact match. Alternatively, confirmation of the resource exchange may be required if the resource exchange is not an exact match (e.g., denominations of resources are not the same, amounts of the resources being transferred are not exact matches, timing isn't exactly the same, or the like). For example, the resource exchange system 206 may identify potential matches (e.g., exact or similar resource exchanges) and send notifications to the organizations to agree to such resource exchanges.

FIG. 4 further illustrates in block 410 that the organizations alone, or through a third-party (e.g., a service provider—such as, a carrier), completes the resource exchange interaction by transferring the physical resources. For example, should the resource interaction be an exchange of resources between two organization resource locations, the organizations, or the third-party acting on behalf of the organizations, may transfer the resources directly from a first resource location 350 of a first organization to a second resource location 350 of a second organization. As such, a carrier does not have to transfer resources owned by the first organization from the first resource location 350 to the resource center 370 (e.g., the first organization's resource cage at the resource center 370), and from the resource center 370 (e.g., the second organization's resource cage at the resource center 370) to the second organization's resource location 350 (e.g., bank branch). In other examples, the transfer of resources may be made by the service provider directly within the resource center 370 (e.g., from a first organization's resource cage to a second organization's resource cage at the resource center 370) without having to transfer resources to or from the organization resource locations 350 and/or the agency resource location 380.

Block 412 in FIG. 4 illustrates that the resource exchange interactions and the associated physical resource transfer are electronically settled through the resource exchange platform. For example, the resource exchange system 206 may utilize a distributed ledger on which each exchange of the physical resources between the organizations, the agency, and/or the third-parties are entered. The agency, and potentially each individual organization has the ability to view the resource interactions entered into the ledger. In some embodiments, each organization only has the ability to review the interactions it enters into with other organizations, the third-parties, and/or the agency, while the agency may be able to review every resource exchange. Alternatively, in some embodiments each organization has an individual ledger which are each used to populate the distributed general ledger, which may only be reviewable by the agency. As will be described with respect to FIG. 5, the distributed ledgers may be implemented through a blockchain system.

FIG. 4 further illustrates in block 414 that the agency is able to monitor all of the resource exchanges through the distributed general ledger and/or each individual organization ledger. As such, the agency may be able to monitor physical resource transfers between organizations for identification of potential misappropriated resources, as well as to better predict the physical resources the agency needs to keep at the agency resource locations 380 in order to be able to distribute resources that may be requested by the organizations.

Block 416 of FIG. 4 further illustrates that the agency is able to identify potential misappropriation activities by monitoring the resource interactions. For example, the agency is able to review the transfer of physical resources between organizations including the resource exchange characteristics, such as the resource amounts, resource denominations, timing, frequency, locations, or the like. In the current supply chain system the agency has the ability to review each organizations' own resource interactions by auditing the organizations' own tracking of resources, but the agency does not have the ability to review the resource exchange interactions of all the organizations together in real-time (e.g., near real-time or in real time) in a single location. The resource exchange platform allows the agency to more accurately track and identify potential money laundering activities, or other activities in which entities may be misappropriating physical resources (e.g., within the entities and/or outside of the entities by third parties).

It should be understood, while the invention described herein allows for the exchange of different denominations of physical resources (e.g., $100 exchanged for $50 s, or the like) between entities (e.g., each organization and/or service provider transferring physical resources to each other), it should be understood that the invention allows for the exchange of physical resources from one organization (e.g., financial institution) to another in one-direction and to electronically reconcile (e.g., settle) the interaction. As such, a first organization may require a resource amount, which a second organization wants to, or is willing to, send to the first organization. Consequently, the second organization may send the physical resources to the first organization (e.g., the physical resources may be moved from a second organization resource location to the first organization resource location, between resource areas—cages within a resource center—a vault, or the like). On the back end, the first organization can send an electronic payment to the second organization to reconcile the physical resource transfer from the second organization to the first organization. In some embodiments, the physical resource exchange is occurring between partner entities, and as such, the exchange may include the completion of the interaction without a resource payment being assessed against the institution requesting the physical resources.

In another example, a group of organizations may collectively require one or more denominations of physical resources, such as multiple organizations each require $100,000 in $20 denominations, and/or $20,000 in $50 denominations. This situation may occur in instances when an event is occurring in a location and there is not an even supply and demand for resources within the locations. As such, the present invention also allows for a single organization (e.g., a financial institution) and/or a third party (e.g., such as the service provider, or the like) to request the aggregated physical resources from the service provider and/or the agency, which improves the efficiency, timing, and costs (only paying a single transaction payment with the service carrier and/or the agency) of the resource transfer. Thereafter, the single organization and/or the service provider can distribute the physical resources when needed, either to itself (e.g., when the physical resources are needed at its own resource location), or to other the other organizations (e.g., when the physical resources are needed by the other organization's at their resource locations). Any transfer from the first organization to the other organizations can be reconciled electronically on the back end, as described herein.

The present invention allows for the organization to receive or send its physical resources, as desired, without having to transfer its own physical resources between its own resource locations, to/from a resource center, and/or enter into an interaction with agency to transfer resources to/from an agency location. The present invention provides improved efficiency, timing, costs (lower costs, etc.) for the exchange of resources between entities.

Figure 5:
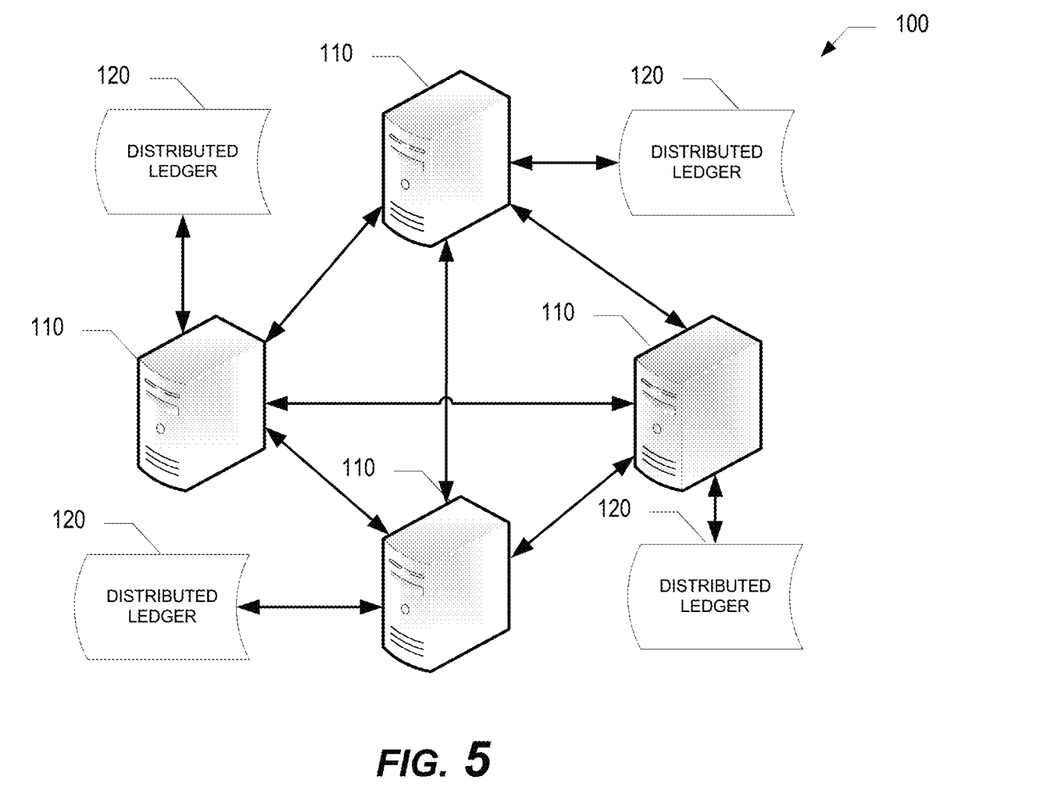
FIG. 5 provides a system environment for implementation of a distributed ledger using blockchain technology, in accordance with embodiments of the present disclosure.

FIG. 5 provides a block chain system diagram 100, illustrating how a block chain operates, and how the general ledger of the present invention may be implemented in some embodiments of the invention through the use of a distributed general ledger. As such, instead of utilizing a centralized database to access, view, store, disseminate, and/or validate information related to the resource exchanges between the organizations, the present invention may utilize a decentralized block chain configuration or architecture, as shown in FIG. 5, in order to allow users to access, view, store, disseminate, and/or validate information, or take another action related to resource exchanges. Such a decentralized block chain configuration ensures accurate mapping and validation of resource exchange characteristics, and provides a secure network over which the resource exchanges and characteristics thereof may be validated. Accordingly, block chain configurations may be utilized with respect to any type of information, such as, but not limited to maintaining an accurate general ledger of information, such as the resource exchanges and resource information associated therewith, as described herein.

A block chain (otherwise described herein as a "blockchain") is a distributed database that maintains a list of data records, the security of which is enhanced by the distributed nature of the block chain. A block chain typically includes several nodes, which may be one or more entities, systems within an entity, machines, computers, databases, data stores, or the like operably connected with one another. For example, the various systems described with respect to FIG. 1, or the systems within the systems described with respect to FIG. 1 may be nodes. In some aspects of the invention, an entity may be a node of a block chain, and internal or external users 4 may access the entity systems in order to take actions with respect to an event. In other aspects of the invention, various systems within an entity may be nodes, which may or may not be grouped together and associated with the entity. In other aspects of the invention, each of the nodes or multiple nodes are maintained by different entities, or components within an entity, and as such different systems within an entity or between entities may act as nodes. A block chain typically works without a central repository or single administrator, however, in the present invention a network of nodes within a single entity or group of entities may together serve as a central repository or single administrator that can control access to the block chain that is associated with a plurality of different nodes.

A block chain provides numerous advantages over traditional databases. For example, with respect to utilizing a block chain for resource exchanges, a large number of nodes of a block chain may reach a consensus regarding the validity of a resource transfer contained on a decentralized resource transfer ledger. Similarly, when multiple versions of a document or resource transfer exits on the ledger, multiple nodes can converge on the most up-to-date version of the resource transfer. For example, in the case of a resource exchange, any node within the block chain that stores or validates the resource exchange, can determine within a level of certainty whether the resource exchange can take place and become final by confirming that no conflicting resource exchanges (i.e., the same resource amount, time, location, or the like has not already occurred) are confirmed by the block chain elsewhere on other nodes.

The block chain typically has two primary types of records. The first type is the event type (e.g., resource exchange type, document type, or the like), which consists of the actual data stored in the block chain. The second type is the block type, which are records that confirm when and in what sequence certain events (e.g., resource exchanges, or the like) became recorded as part of the block chain. Events (e.g., resource exchanges, or the like) are created by the users 202 using the block chain in its normal course of business, for example, when one organization exchanges resources with another organization), blocks are created by users known as "miners" who use specialized software/equipment to create the blocks for the event. Users 202 of the block chain create blocks for the events (e.g., resource transfers, or the like), which are passed around to various nodes of the block chain. A "valid" resource transfer is one that can be validated based on a set of rules that are defined by the particular system implementing the block chain. For example, in the case of a resource exchange, a valid resource exchange is one that may be digitally signed by the organizations, sent from valid digital systems, and in some cases, meets other criteria (e.g., certain security features are met, authorization credentials of users, or the like). In some block chain systems, miners create blocks because of a reward structure that offers a pre-defined per-block reward and/or payments offered within the resource exchanges validated themselves. Thus, when a miner successfully validates a resource exchange on the block chain, the miner may receive rewards and/or payments as a reason to continue creating new blocks.

As mentioned above and referring to FIG. 5, a block chain 100 is typically decentralized—meaning that a distributed ledger 120 (e.g., a decentralized ledger) is maintained on multiple nodes 110 of the block chain 100. One node in the block chain may have a complete or partial copy of the entire ledger or set of events (e.g., resource exchanges, or the like) and/or blocks on the block chain. Events (e.g., resource exchanges, or the like) are initiated at a node of a block chain and communicated to the various other nodes of the block chain. Any of the nodes, or users 202 of the nodes, which have access to the block chain to validate an event, add the event to its copy of the block chain, and/or broadcast the event (e.g., resource exchange, or the like) its validation (in the form of a block) and/or other data to other nodes. This other data may include time-stamping of the resource exchange.

In various aspects, the block chain may be configured with a set of rules (otherwise described herein as "limits") to dictate what actions may be taken by users and/or nodes for various events, how information may be accessed, created, stored, disseminated, and/or validated, and/or how the network communicates information throughout the one or more block chains across the nodes of various entities associated with the nodes (e.g., supports the nodes on the entity systems). In some aspects, the rules dictate that an originating node (e.g., a node through which a resource transfer was initiated) must approve all actions for events mapped to that node. In some aspects, the rules dictate that some or all actions for events may be approved by one or more validator nodes without further input from the originating node. In some such cases, the rules dictate that additional information is needed in determining whether an action for an event should be approved. In other aspects, the validating node must reach out to the originating node in certain situations as dictated by the rules. For example, if the action for the event, such as validating a resource exchange, is in any way, indicated to be a faulty or invalid (due to some information present on the block chain), then the rules may dictate that the validating node communicate with the originating node to confirm or deny validation of the event.

In some aspects, the validator may approve the event (e.g., resource exchange, or the like) without communicating with the originating node. In such a case, the validator (or a group or all of validators if multiple or universal validations, respectively, are required by the rules), can approve the action for the event based solely on the information contained in the block chain. Thus, if an action for an event is requested and a validator receives the action for the event, it can check the actions for the event against its ledger to determine whether an originating node has validated the event. If so, then the validator may approve the action for the event. In this regard, the action for the event may be approved very quickly, and in some cases, in real-time or near real-time.

In various aspects, any of the nodes 110 illustrated in FIG. 5, may be a validator or a miner that validates events (e.g., resource transfers, or the like). In some aspects, a number of the nodes 110 must validate an event (e.g., resource transfer, or the like) in order for the event to be approved. For example, in one embodiment, two or three nodes 110 must validate the authenticity of the event, or portions thereof, before the event may be approved. As noted above, in some instances, the rules of the block chain and/or rules specific to particular originating entities or validators dictate that validators cannot approve events without confirming available information (e.g., amount of the resource exchange or other resource exchange characteristics). In some cases, the available information is already associated with an alias on the public block chain, or associated with an organization within an entity controlling a private block chain, but in other cases, the validator on the block chain must communicate with the originating entity in order to request approval of the event (e.g., resource transfer, or the like).

In some aspects, the rules may only be changed by the originating node (maintained by an originating entity or entities that control the block chain) to ensure the validity of a change to a rule. In some cases, particularly in cases where one or more nodes have raised a concern that an event is not valid, the originating node may be contacted for verification of the event.

In various aspects, the event, or information for the event, is stored and executed from one or more systems and is not placed on the public block chain itself, and instead is located on a private portion of the block chain. In some aspects, the event, or information for the event, is only stored and executed from a subset of the nodes of the block chain, which, in some aspects, are synonymous with validator nodes and in other aspects are not synonymous with the validator nodes. In some aspects, placeholder(s) for the event (e.g., resource transfers, or the like) indicating that the event exists and/or a description of the event, is accessible from private block chains and may be placed on the public block chain. The placeholder(s) may be identifiers (e.g., characters, or the like) and/or a description of the event. In some cases, the event may be executed only by the designated one or more systems (e.g., on the private block chain, or on a private portion of a block chain). Such systems may utilize a key or other security mechanism(s) in order to ensure only certain nodes are allowed access to the information related to the private block chain portion. In some cases, this configuration may result in additional security instead of placing the event on the public block chain for any node to execute.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A resource exchange system for facilitating a plurality of resource exchanges between a plurality of organizations, the system comprising:
   one or more memory components having computer readable code stored thereon; and
   one or more processing components operatively coupled to the one or more memory components, wherein the one or more processing components are configured to execute the computer readable code to:
      provide one or more resource exchange interfaces to the plurality of organizations, wherein the one or more resource exchange interfaces comprise an indication of available resources for exchange, wherein the available resources are actual physical resources that are available for exchange;
      receive a plurality of resource acquisition requests from a plurality of first organizations;
      receive a plurality of resource disbursement requests from a plurality of second organizations, wherein the plurality of first organizations and the plurality of second organizations are financial institutions;
      display the plurality of resource acquisition requests from the plurality of first organizations and the plurality of resource disbursement requests from the plurality of second organizations on the one or more resource exchange interfaces;
      determine a resource exchange when a first resource acquisition request of a first organization from the plurality of first organizations meets a first resource disbursement request of a second organization from the plurality of second organizations;
      receive confirmation from the first organization and/or the second organization regarding the resource exchange based on the available resources for exchange, wherein the confirmation includes resource exchange characteristics;
      send a physical transfer request for the resource exchange including the resource exchange characteristics in order to transfer physical resources that meet the resource exchange characteristics, wherein the transfer of the physical resources occurs between a first location of the first organization to a second location of the second organization without transferring the physical resources for the resource exchange to a resource center location or an agency resource location; and settle the resource exchange electronically on a ledger, wherein an agency has access to the plurality of resource exchanges by the plurality of organizations on the ledger.

2. The system of claim 1, wherein each of the plurality of resource acquisition requests and the plurality of resource disbursement requests displayed on the one or more resource exchange interfaces comprises the resource exchange characteristics.

3. The system of claim 1, wherein determining the resource exchange comprises the first organization communicating with the second organization through the one or more resource exchange interfaces until the first resource acquisition request meets the first resource disbursement request.

4. The system of claim 1, wherein determining the resource exchange comprises
analyzing the plurality of resource acquisition requests from the plurality of organizations;
analyzing the plurality of resource disbursement requests from the plurality of organizations; and
notifying the first organization and the second organization of the resource exchange when the first resource acquisition request of the first organization meets the first resource disbursement request of the second organization.

5. The system of claim 1, wherein the transfer of the physical resources is performed without transferring the physical resources to and from the agency resource location, and wherein the agency resource location is a Federal Reserve bank location.

6. The system of claim 1, wherein the transfer of the physical resources occurs at a resource center without transferring the physical resources to and from a resource center location, wherein the resource center location is a vault that holds resources of the plurality of first organizations and the plurality of second organizations in cages within the vault.

7. The system of claim 1, wherein the resource exchange characteristics comprise a resource amount, one or more resource denominations, one or more resource exchange locations, and resource exchange timing.

8. The system of claim 7, wherein the one or more resource denominations for the resource exchange comprises a first resource denomination for the first resource acquisition request from the first organization that is different from a second resource denomination for the first resource disbursement request from the second organization.

9. The system of claim 7, wherein the one or more resource exchange locations comprise an exchange within a resource center, wherein the transfer of the physical resources comprises moving the physical resources from a second organization cage to a first organization cage without transferring the physical resources to or from the agency resource location.

10. The system of claim 7, wherein the one or more resource exchange locations comprise organization resource locations, wherein the organization resource locations may comprise branches, ATMs, kiosks, recyclers, or resource distribution locations where physical resources are located.

11. The system of claim 7, wherein the resource exchange timing sets when the transfer of the physical resources occurs.

12. The system of claim 1, wherein the ledger is implemented through use of a blockchain, wherein the blockchain comprises a private blockchain or a hybrid private and public blockchain.

13. The system of claim 12, wherein the ledger is implemented through use of the blockchain using distributed ledgers.

14. The system of claim 1, wherein settlement is also electronically settled using organization ledgers of the first organization and the second organization, wherein each of the organization ledgers are only accessible by an organization associated with its organization ledger.

15. A computer implemented method for facilitating a plurality of resource exchanges between a plurality of organizations, the method comprising:
providing, by one or more processing devices, one or more resource exchange interfaces to the plurality of organizations, wherein the one or more resource exchange interfaces comprise an indication of available resources for exchange, wherein the available resources are actual physical resources that are available for exchange;
receiving, by the one or more processing devices, a plurality of resource acquisition requests from a plurality of first organizations;
receiving, by the one or more processing devices, a plurality of resource disbursement requests from a plurality of second organizations, wherein the plurality of first organizations and the plurality of second organizations are financial institutions;
displaying, by the one or more processing devices, the plurality of resource acquisition request from the plurality of first organizations and the plurality of resource disbursement requests from the plurality of second organizations on the one or more resource exchange interfaces;
determining, by the one or more processing devices, a resource exchange when a first resource acquisition request of a first organization from the plurality of first organizations meets a first resource disbursement request of a second organization from the plurality of second organizations;
receiving, by the one or more processing devices, confirmation from the first organization and/or the second organization regarding the resource exchange based on the available resources for exchange, wherein the confirmation includes resource exchange characteristics;
sending, by the one or more processing devices, a physical transfer request for the resource exchange including the resource exchange characteristics in order to transfer physical resources that meet the resource exchange characteristics, wherein the transfer the physical resources occurs between a first location of the first organization to a second location of the second organization without transferring the physical resources for the resource exchange to a resource center location or an agency resource location; and
settling, by the one or more processing devices, the resource exchange electronically on a ledger, wherein an agency has access to the plurality of resource exchanges by the plurality of organizations on the ledger.

16. The method of claim 15, wherein each of the plurality of resource acquisition requests and the plurality of resource disbursement requests displayed on the one or more resource exchange interfaces comprises the resource exchange characteristics.

17. The method of claim 15, wherein determining the resource exchange comprises the first organization communicating with the second organization through the one or more resource exchange interfaces until the first resource acquisition request meets the first resource disbursement request.

18. The method of claim 15, wherein determining the resource exchange comprises
- analyzing, by the one or more processing devices, the plurality of resource acquisition requests from the plurality of organizations;
- analyzing, by the one or more processing devices, the plurality of resource disbursement requests from the plurality of organizations; and
- notifying, by the one or more processing devices, the first organization and the second organization of the resource exchange when the first resource acquisition request of the first organization meets the first resource disbursement request of the second organization.

19. A computer program product for facilitating a plurality of resource exchanges between a plurality of organizations, the computer program product comprising at least one non-transitory computer-readable medium having computer-readable program code portions embodied therein, the computer-readable program code portions comprising:
- an executable portion configured to provide one or more resource exchange interfaces to the plurality of organizations, wherein the one or more resource exchange interfaces comprise an indication of available resources for exchange, wherein the available resources are actual physical resources that are available for exchange;
- an executable portion configured to receive a plurality of resource acquisition requests from a plurality of first organizations;
- an executable portion configured to receive a plurality of resource disbursement requests from a plurality of second organizations, wherein the plurality of first organizations and the plurality of second organizations are financial institutions;
- an executable portion configured to display the plurality of acquisition request from the plurality of first organizations and the plurality of disbursement requests from the plurality of second organizations on the one or more resource exchange interfaces;
- an executable portion configured to determine a resource exchange when a first resource acquisition request of a first organization from the plurality of first organizations meets a first resource disbursement request of a second organization from the plurality of second organizations;
- an executable portion configured to receive confirmation from the first organization and/or the second organization regarding the resource exchange based on the available resources for exchange, wherein the confirmation includes resource exchange characteristics;
- an executable portion configured to send a physical transfer request for the resource exchange including the resource exchange characteristics in order to transfer physical resources that meet the resource exchange characteristics, wherein the transfer the physical resources occurs between a first location of the first organization to a second location of the second organization without transferring the physical resources for the resource exchange to a resource center location or an agency resource location; and
- an executable portion configured to settle the resource exchange electronically on a ledger, wherein an agency has access to the plurality of resource exchanges by the plurality of organizations on the ledger.

20. The computer program product of claim 19, wherein each of the plurality of acquisition requests and the plurality of disbursement requests displayed on the one or more resource exchange interfaces comprises the resource exchange characteristics.

* * * * *